United States Patent [19]

Glomski et al.

[11] 3,716,507

[45] Feb. 13, 1973

[54] HYDROXYPROPYLMETHYLCELLU-LOSE AS A PROTECTIVE COLLOID IN VINYL MONOMER POLYMERIZATION

[75] Inventors: Ronald L. Glomski; George K. Greminger, Jr., both of Midland, Mich.

[73] Assignee: The Dow Chemical Company, Midland, Mich.

[22] Filed: March 2, 1971

[21] Appl. No.: 120,324

[52] U.S. Cl. ....260/17 R, 260/85.5 N, 260/85.5 XA, 260/87.1, 260/92.8 W
[51] Int. Cl. .............................C08f 1/11, C08f 1/13
[58] Field of Search........260/17 R, 85.5 N, 85.5 XA, 260/87.1, 92.8 W

[56] References Cited

UNITED STATES PATENTS 3,375,238  3/1968  Bauer et al.......................260/17 R X
3,388,082  6/1968  Rodgers et al.......................260/17 R
3,499,850  3/1970  Kinzie................................260/17 R Primary Examiner—William H. Short
Assistant Examiner—L. M. Phynes
Attorney—Griswold & Burdick, Ronald G. Brookens and Albin R. Lindstrom

[57]  ABSTRACT

An improvement in the process for preparing vinyl polymers in aqueous suspension, said improvement comprising the use of hydroxypropylmethylcellulose having a methoxyl degree of substitution of from 0.4 to 1.3 and a hydroxypropyl molar substitution of from 0.2 to 1.4 and a total substitution of at least 1.0 combined degree of methoxyl substitution and degree of hydroxypropyl molar substitution as the protective colloid in the water-phase of an oil-in-water suspension system.

4 Claims, No Drawings

HYDROXYPROPYLMETHYLCELLULOSE AS A PROTECTIVE COLLOID IN VINYL MONOMER POLYMERIZATION

BACKGROUND OF THE INVENTION

It is known that substantially water-insoluble monoethylenically unsaturated monomer, such as vinyl chloride, can be polymerized in aqueous suspension in the presence of a number of natural and synthetic water-soluble polymers which function as protective colloids in the polymerization process to provide products of desirably uniform particle size distribution. Exemplary of such prior known protective colloids or dispersing agents are the hydroxypropylmethylcellulose materials as described in U.S. Pat. No. 2,538,051, as well as the methylcelluloses, polyvinylalcohol and gelatin. These polymers, due to their surface activity in water are capable of dispersing and stabilizing water immiscible monomers in water and may be classified as weak polymeric surfactants. Like a surfactant, they function by lowering the interfacial tension between monomer and water, thereby permitting the stabilized monomer to polymerize in a distinct size distribution.

When polymerization recipes and procedures result in excessive foaming problems in the reactor, a shift to the use of higher surface tension can be helpful in alleviating the problem. However, when a product such as hydroxyethylcellulose with a high surface tension is used to achieve this, control of the reaction becomes more difficult and the resulting particles are hard, non-porous glassy beads with unacceptable plasticizer absorption.

Further, it has been unexpectedly found that hydroxypropylmethylcellulose having a methoxyl degree of substitution in excess of 1.3, e.g., from about 1.6 to 2.0 (as described in U.S. Pat. No. 2,538,051), is incapable of providing polymer particles of uniform size which are characterized by having the desirably high level of plasticizer absorption as obtained by use of the hydroxypropyl-methylcellulose materials prescribed by the present invention (see Table I, infra).

SUMMARY OF THE INVENTION

The present invention resides in the use as a protective colloid in the non-emulsified aqueous phase of the suspension polymerization of vinyl monomers of from about 0.05 to 5 percent, based on monomer weight, of a water-soluble hydroxypropylmethylcellulose ether having a methoxyl degree of substitution of from 0.4 to 1.3 and a hydroxyl molar substitution of from 0.2 to 1.4 and a total substitution of at least 1.0 combined methoxyl substitution and degree of hydroxypropyl molar substitution.

DESCRIPTION OF THE PREFERRED EMBODIMENTS

The cellulose ethers utilized in the present invention are specifically disclosed and claimed in U.S. Pat. No. 3,388,082, issued June 11, 1968, which patent sets forth methods for their preparation.

As described herein, the prescribed hydroxypropylmethylcellulose ethers are particularly effective as protective colloids or dispersing agents, for the polymerization of vinyl monomers such as vinyl chloride. Exemplary of other monomeric materials which may be copolymerized with vinyl chloride are the vinyl alkanoates such as vinyl acetate, vinyl propionate and the like and acrylonitrile and methacrylonitrile, and mixtures thereof.

Obtainment of desired polymer particle size may be realized utilizing the prescribed cellulose ethers in a concentration ranging generally from about 0.1 to 5 percent based on the weight of monomer.

The choice of methoxyl substitution and hydroxypropyl molar substitution viscosity will depend upon the system employed. For polymerization of vinyl chloride and vinyl chloride copolymers with monomers such as vinyl-acetate, a product with a methoxyl degree of substitution of from 1.0 to 1.3 and a hydroxypropyl molar substitution of from 0.75 to 1.0, with a viscosity of about 7.3 cps. at two percent concentration and 20° C. is preferred.

Further, as in usual aqueous suspension polymerization reactions of the type contemplated herein, the polymerization proceeds in the presence of a polymerization catalyst. In this regard, the catalyst isopropyl percarbonate has been found to be particularly effective.

The following example further illustrates the present invention and its advantages. Unless otherwise specified all parts and percentages are by weight.

EXAMPLE

In each of a series of individual experiments a two gallon glass lined reactor fitted with a glass crow-foot agitator, a stainless steel finger baffle and a pressure release valve was first purged with nitrogen. Thereafter 3,540 grams of demineralized water, and 3.54 grams of surface active agent (representing a 0.2 percent solution of the hereafter identified cellulosic material in water) and 2.5 grams of a 20 percent solution of the catalyst isopropyl percarbonate in xylene was added. A partial vacuum was then created in the reactor and 1,770 grams of vinyl chloride added with agitation at 225 RPM for 5 minutes. The reactor temperature was brought to 54° C. At ten pound pressure decrease from maximum pressure, the reaction was placed on full cooling and vented to zero pounds pressure, then evacuated to 20 inches of mercury.

The polymerized vinyl chloride was removed from the reactor, washed with water then filtered and dried overnight at 50° C.

The following Table I identifies the cellulosic materials used and describe the resulting polymer:

TABLE I

| Exp. No. | 1 | 2 | 3 |
|---|---|---|---|
| Protective Colloid Type | A* | B* | C* |
| % based on Monomer | 0.2 | 0.2 | 0.2 |
| 2% Visc. at 20°C (CPS) | 50. | 15 | 7.3 |
| Bulk Density (gms/sec) | 0.49 | 0.57 | 0.50 |
| Polymer Characteristics | | | |
| % plasticizer absorption (% dioctylphthalate based on resin wt.) | 86 | 64 | 108 |
| Powder Mix time (Min.) | 5 | 60 | 5.2 |
| Dry Flow Time (Sec.) | 6.5 | 6.2 | 6.9 |
| USS Screen Analysis (% retained on screen) | | | |
| <70 | 8.85 | 7.7 | 0.02 |
| 70–100 | 89.1 | 87.2 | 97.1 |
| >100 | 2.1 | 5.1 | 2.9 |
| % Yield | 78 | 78.8 | 80.8 |

*A (For Comparison) Hydroxypropylmethylcellulose 1.66 to 1.95 methoxyl, 0.1 to 0.20 hydroxypropyl
*B (For Comparison) Hydroxyethylcellulose (NATROSOL LB)
*C (The Invention) Hydroxypropylmethylcellulose 1.0 to 1.3 methoxyl, 0.75 to 1.0 hydroxypropyl The above data illustrate the significantly improved plasticizer absorption and uniformity of particle size obtained by utilization of the hydroxypropyl-methylcellulose material of Experiment 3, which material is representative of the present invention.

What is claimed is:

1. In the process of polymerizing vinyl chloride monomer in non-emulsified aqueous suspension in the presence of a polymerization catalyst and a protective colloid the improvement consisting of:
    using as said protective colloid from about 0.05 to 5 percent, based on monomer weight of a water-soluble hydroxypropylmethylcellulose having a methoxyl degree of substitution of from 0.4 to 1.3 and a hydroxypropyl molar substitution of from 0.2 to 1.4 and a total substitution of at least 1.0 combined degree of methoxyl substitution and degree of hydroxypropyl molar substitution.

2. The process of claim 1 wherein said hydroxypropylmethylcellulose has a methoxyl degree of substitution of from 1.0 to 1.3 and a hydroxylpropyl molar substitution of from 0.75 to 1.0.

3. The process of claim 2 wherein said hydroxypropylmethylcellulose has a viscosity of about 7.3 cps at 2 percent concentration at 20° C. in the polymerization system.

4. The process of claim 1 wherein said polymerization catalyst is isopropyl percarbonate.

* * * * *